Patented Aug. 15, 1933

1,922,240

UNITED STATES PATENT OFFICE 1,922,240

DI-PHENYL PHENOLPHTHALEIN, SUBSTITUTION PRODUCTS THEREOF, AND METHOD OF PREPARING SAME

Sidney E. Harris, Brooklyn, N. Y., and Walter G. Christiansen, Bloomfield, N. J., assignors to E. R. Squibb & Sons, Brooklyn, N. Y., a Corporation of New York No Drawing. Application May 23, 1931
Serial No. 539,632

9 Claims. (Cl. 260—65)

This invention relates to the novel compounds, di-phenyl phenol phthalein and substitution products thereof, adapted for use as intermediates in the preparation of therapeutic agents.

The product, di-phenyl phenol phthalein, is prepared by the reaction between o-phenyl phenol, phthalic anhydride and sulphuric acid under the conditions hereinafter defined. After purification and precipitation from solution, the product is a white, fluffy powder, soluble in alcohol, ether and other organic solvents. It is likewise soluble in alkali solutions, giving a deep blue-violet solution from which the di-phenyl phenol phthalein may be precipitated by the addition of acids. The product has a melting point of 234°–235° C. It is represented by the following formula:

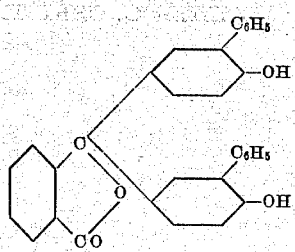

Various substitution products can be prepared, with the general formula

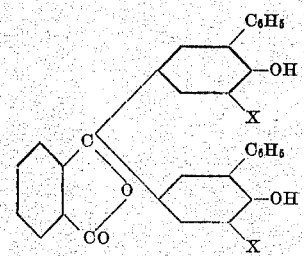

in which X represents a monovalent substituent, especially hydrogen, a halogen, nitro, amino or an alkyl. Such products have the general characteristics of di-phenyl phenol phthalein and are useful for similar purposes.

As an example of the method of preparing di-phenyl phenol phthalein:

10 gms. phthalic anhydride, 36 gms. o-phenyl phenol and 8 gms. sulphuric acid are heated together at 130°–140° C. for about 4 hours. The mixture is then treated with boiling water and boiled to remove the excess of o-phenyl phenol. The product may be purified by treatment with charcoal in alcoholic solution. Dilution and evaporation of the alcohol precipitates the product as a white fluffy powder.

To prepare substitution products, the di-phenyl phenol phthalein is treated with suitable reagents. Thus to substitute bromine for X in the general formula:

9.5 gms. di-phenyl phenol phthalein is suspended in 100 ccs. of alcohol, and 6.5 gms. of bromine are added to the well-stirred mixture. The di-phenyl phenol phthalein gradually dissolves as the bromine is added. The solution is then permitted to stand at room temperature for some time and is diluted with five volumes of water. The precipitate is filtered, thoroughly washed with water, and dried in vacuo. The product may be purified by treatment with charcoal in alcohol solution and is reprecipitated as a white powder which is soluble in alcohol, ether, glacial acetic acid and other organic solvents. It is insoluble in water but dissolves in alkaline hydroxide solutions, giving a deep blue solution. Its melting point is 110°–111° C.

To prepare di-nitro di-phenyl phenol phthalein:

9.5 gms. of di-phenyl phenol phthalein are suspended in 100 ccs. of glacial acetic acid and 3 ccs. of nitric acid are added slowly with agitation. The mixture is warmed for a short time on a water bath to complete the reaction and poured into 500 ccs. of water. The precipitate is filtered, washed free of acid and recrystallized from alcohol. The product is a yellow powder with a melting point of 135° C.

The foregoing description of the methods employed is merely illustrative of the invention. The reagents and amounts thereof employed will vary with the particular compound desired. Various changes may be made in the details of procedure without departing from the invention or sacrificing its advantages.

We claim:
1. The product represented by the formula

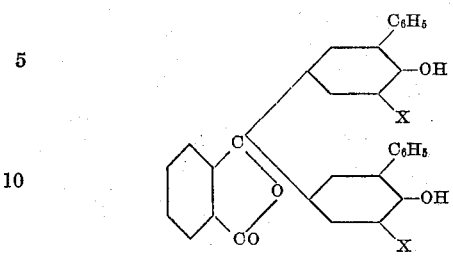

in which X represents hydrogen, a halogen, nitro, amino, or an alkyl.

2. The product represented by the formula:

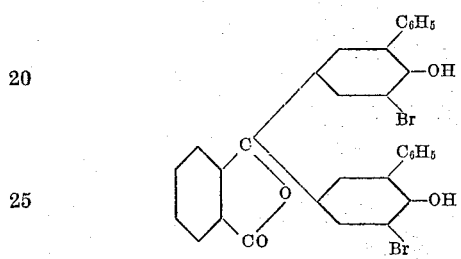

3. The product di-phenyl phenol phthalein, represented by the formula:

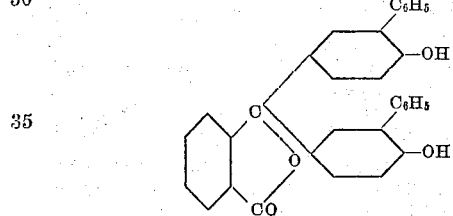

4. Halogen, nitro, amino and alky substitution derivatives of di-phenyl phenol phthalein.

5. Halogen substitution products of di-phenyl phenolphthalein.

6. Nitro substitution derivatives of di-phenyl phenolphthalein.

7. The product di-nitro di-phenyl phenolphthalein.

8. The method of making diphenylphenolphthalein having the following formula,

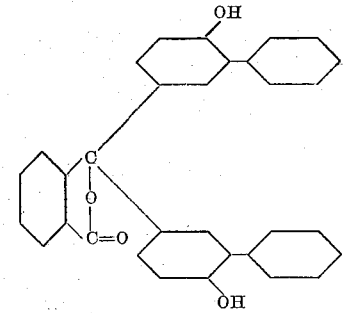

which comprises reacting ortho-phenylphenol with phthalic anhydride.

9. The method of making diphenylphenolphthalein having the following formula,

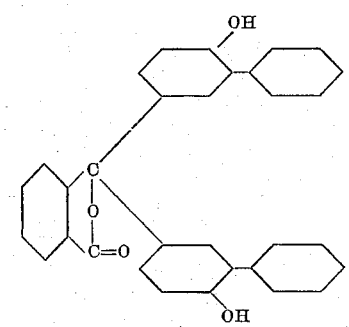

which comprises reacting ortho-phenylphenol with phthalic anhydride in the presence of a dehydrating condensation agent.

SIDNEY E. HARRIS.
WALTER G. CHRISTIANSEN.